Mar. 3, 1925.
H. FISCHER
INTERNAL COMBUSTION ENGINE
Filed July 17, 1923
1,528,665
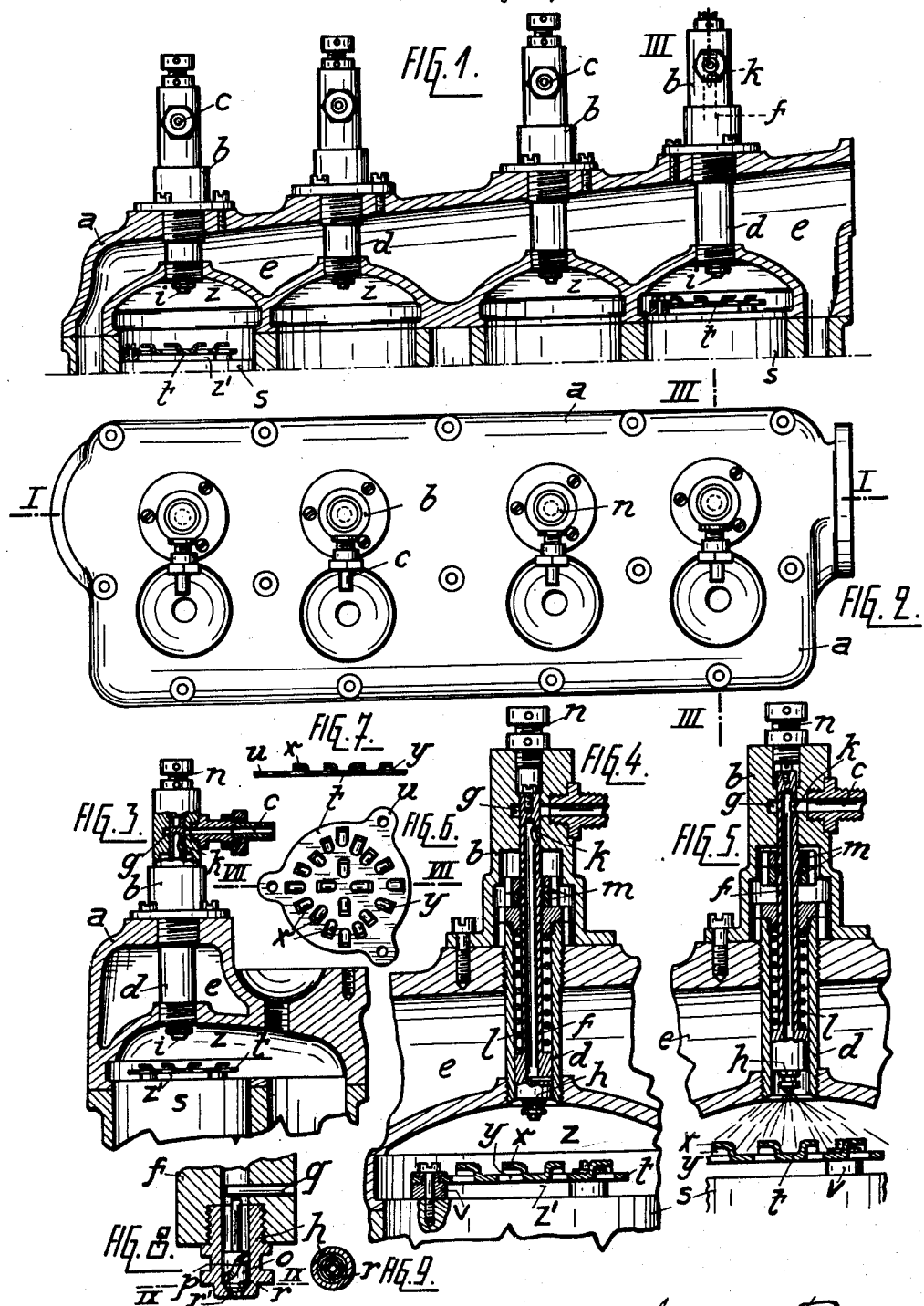

Patented Mar. 3, 1925.

1,528,665

UNITED STATES PATENT OFFICE.

HERMANN FISCHER, OF BERLIN-NEUKOLLN, GERMANY, ASSIGNOR OF ONE-HALF TO HENRY KOEHLER, OF SAN ANTONIO, TEXAS.

INTERNAL-COMBUSTION ENGINE.

Application filed July 17, 1923. Serial No. 652,141.

*To all whom it may concern:*

Be it known that I, HERMANN FISCHER, a citizen of the German Republic, residing at 2 Schillerpromenade, Berlin-Neukolln, Germany, have invented certain new and useful Improvements in Internal-Combustion Engines, of which the following is a specification.

This invention relates to internal combustion engines and more particularly to devices of the kind described in the copending application Ser. No. 568,620 of the 15th of June 1922 which is designed to utilize, by means of water sprayed against the highly heated surfaces in the engine, the heat developed when the mixture of air and fuel is ignited in the combustion chamber of the motor. In accordance with the present invention this arrangement is improved by the provision of means which only allow water to be injected into the explosion or combustion chamber whenever an ignition has taken place, and which prevent the injection of water if the ignition fails take place.

The arrangement according to the invention therefore prevents water from collecting in the cylinder in cases of repeated failures of ignition, and thus obviates damage that might result from the explosion when an undue quantity of water is present in the cylinder. Another important feature of the present invention consists in providing a plate of sheet iron at the top surface of the piston and in forming this plate in a certain way. By this construction it is possible to employ such plates, against which the injected water is directed, in automobile motors.

The arrangement for preventing the injection of water into the cylinder in case the ignition fails comprises means for normally closing the passage through which water passes into the cylinder and for only opening this passage whenever the maximum pressure, due to an explosion in the cylinder, arises immediately after an ignition. The means for conducting the water into the cylinder head consists, in accordance with the invention, of a tubular valve terminating at one end in an ejection nozzle and closed at the other end. This valve is normally pressed into the head of the cylinder by a strong spring. Near its closed end the tubular portion of the valve has an admission port or slot which is only raised so as to register with a water inlet port whenever the tubular valve is momentarily moved outward, against the pressure of the said strong spring, by the pressure due to an explosion.

In order to cause the water that issues from the tubular valve to squirt out in all directions a rotary body is arranged in the lower end of the tubular valve and this rotary body has one or more spiral grooves formed in its circumferential surface. The uniform distribution of the spray in all directions is further assisted by the surface of the conical space, which is situated beneath the said rotary body and which forms the ejection nozzle at the one end of the tubular valve, being made rough.

The invention is shown by way of example in the drawing in which—

Fig. 1 is a section on the line I—I of Fig. 2 through a cylinder head of a four cylinder automobile engine provided with four water injecting devices according to the present invention. Fig. 2 is a plan view of Fig. 1, Fig. 3 a section on the line III—III of Fig. 2, Fig. 4 a section corresponding to Fig. 3 drawn on an enlarged scale and Fig. 5 a similar section with the parts in the position which they assume at the moment when water is let into the cylinder head. Figs. 6 and 7 are a plan view and section on lines VII—VII of Fig. 6 respectively of the plate of sheet iron mounted on the piston. Fig. 8 is a section on an enlarged scale of the lower end of the tubular valve and Fig. 9 is a cross section on the line IX—IX of Fig. 8.

Referring to the drawing *a* is the cylinder head of a four-cylinder automobile engine which is provided above the center of each cylinder with a water injecting device. Each of the four water injecting devices consists of a cap *b* screwed to the cylinder head *a* and provided with a water inlet pipe *c* whose connection with the cap *b* is such as to prevent leakage of the injected water. Arranged in the interior of the cap *b* is a sleeve *d* whose upper end is screwed into the cylinder head *a* and which extends through the water chamber *e* in the cylinder head. The sleeve *d* acts as a guide for a longitudinally displaceable tubular valve *f* which can rotate in any direction in the sleeve *d*. A circular groove *g* is formed in the interior of the cap $b$ at the level of the inlet pipe $c$, the groove $g$ being therefore constantly filled with water. The bore of the tubular valve $f$ communicates at the bottom end with a squirting nozzle $i$. At its upper end the tubular valve $f$ is closed and near its closed end it has a slot or port $k$. The tubular valve $f$ is kept pressed downward by a strong spiral spring $l$, whose upper end presses against a shoulder in the sleeve $d$ and whose lower end acts on a shoulder at the bottom end of the tubular valve. The downward motion of the tubular end $f$ is limited by two nuts $m$ adapted to be screwed onto the valve, the lower nut cooperating with the top end of the sleeve $d$. Arranged in the upper end of the cap $b$ is an adjusting screw $n$ whose lower end can be made to project more or less into the middle bore or the cap $b$. The lower internal portion $h$ of the tubular valve $f$ is provided with a member that is screwed into the end of the tube and contains a freely rotatable body $o$ having a spiral groove $p$ in its circumferential surface. The rotary body $o$ is prevented from shifting vertically by a pin $q$ that projects into the interior of the tubular valve $f$. The interior bottom surface of the chamber $r$, at the bottom end of the tube $f$ which is located beneath the body $o$ and which tapers so as to form the ejection nozzle $i$, has a number of ledges or is made rough in any other manner as indicated in Figs. 8 and 9.

Fixed to the piston $s$ of each cylinder is a round disk $t$ of sheet iron provided with fastening lugs $u$. To prevent the conduction of heat between the piston and the disk $t$ insulating members in the form of mica bushings $v$ (see Fig. 4) are inserted between the disk and the piston. Humps $x$ are stamped out of the material of the disk so that a large number of vertical slots $y$ are formed in the disk through which connections are established between the space $z$ above the sheet iron disk $t$ and the space $z'$ located beneath the disk and between the latter and the top surface of the piston. As will be seen in Figs. 4, 5 and 7 the said humps $x$ project upwardly into the space $z$ above the disk $t$.

The sides of the disks $t$ turned towards the nozzles $i$ are oxidized in a high degree, while the lower surfaces of the sheet iron disks are preferably smooth.

The mode of operation of the arrangement is as follows: When the engine is not working, and also while it is performing its ordinary working strokes, the tubular valve $f$ occupies the position shown in Fig. 4 in which the inlet port $k$ of the valve $f$ is lower than the internal circular groove $g$. The spring $l$ is so strong that the tubular valve $f$ is kept in this position not only during the suction and exhaust period, but also during the compression period. The force of the spring $l$ is only overcome in the moment when the maximum pressure occurs in the cylinder, this taking place immediately after the explosion in the interior of the cylinder. At this moment the tubular valve $f$ is moved from the position shown in Fig. 4 upwardly into the position illustrated in Fig. 5, wherein the port $k$ lies opposite to, or registers with, the internal groove $g$ so as to allow the water under pressure in the conduit $c$ to pass through the circular groove $g$ into the interior of the tubular valve $f$ and to pass out of the squirting nozzle $i$ so as to squirt against the oxidized upper surface of the sheet iron disk $t$ which, at this moment, is near the nozzle $i$, because the piston $s$ will then be approximately in its upper dead point position. As soon as the expansion of the gases of combustion begins after the explosion, the pressure in the interior of the cylinder is reduced, and the spring $l$ drives the tubular valve $f$ down again, thus causing the inflow of water into the valve to stop. It is thus seen that a momentary inflow of water into the interior of the cylinder can only take place after an explosion has occurred in the cylinder. The arrangement of the tubular valve $f$, and the roughening of the bottom surface $r$, have the effect of producing a whirling action of the water, so that when it passes out of the exit nozzle $i$ it is sprayed and uniformly distributed in all directions.

The water under pressure is preferably taken from a container or boiler which is maintained under a constant pressure that is high enough to overcome the explosion pressure in the engine cylinder. The pressure in the container may be maintained by an air compressor.

When the set screw or adjusting screw $n$ is set as shown in Fig. 5 the water is admitted through the entire area of the inlet port $k$ of the tubular valve $f$. But if the screw $n$ is driven further into the cap $b$ it will limit the upward motion of the tubular valve $f$ before the entire area of the inlet port $k$ is opposite the inlet pipe $c$ or the internal circular groove $g$, and the quantity of water let into the interior of the cylinder is then proportionally smaller. It is thus possible, by means of the screw $n$, to adjust the amount of water let into the cylinder.

The quantity of water injected into the cylinder after each explosion can also be regulated by increasing or reducing the extent to which the water pressure exceeds the explosion pressure, because the speed of flow of the water into the cylinder depends on the extent to which the explosion pressure is exceeded by the water pressure, and the greater the speed of influx, the more water will be injected in a given time of opening of the inlet port $k$.

The water squirted against the oxidized upper surface of the sheet iron disk $c$ evaporates immediately on account of the above described formation of the upper surface of the sheet iron disk $t$ and the water thus evaporated helps to drive the working piston $s$ outwards. The intercommunication afforded by vertical slots $y$ in the sheet iron disk $t$ helps to balance the pressures at both sides of the sheet iron disk $t$.

I claim:—

1. In an internal combustion engine, a hollow member with an opening near its one end and an opening at the other end into the combustion chamber of the engine, a member surrounding the said hollow member and provided with an inlet passage for water under pressure, and a spring for holding the hollow member in a normal position against the pressure existing in the cylinder during the expansion of gases of combustion therein and adapted to permit the hollow member to be moved into a position in which the opening near its one end registers with the said inlet passage whenever an explosion takes place in the cylinder.

2. In an internal combustion engine, a hollow member with an opening near its one end and an opening at the other end into the combustion chamber of the engine, a member surrounding the said hollow member and provided with an inlet passage for water under pressure, a spring for holding the hollow member in a normal position against the pressure existing in the cylinder during the expansion of gases of combustion therein and adapted to permit the hollow member to be moved into a position in which the opening near its one end registers with the said inlet passage whenever an explosion takes place in the cylinder, and means adjustably connected to the first mentioned member adapted to be engaged by said hollow member for determining the extent of movement of the said hollow member.

3. In an internal combustion engine, a hollow member with an opening near its one end and an opening at the other end into the combustion chamber of the engine, a member surrounding the said hollow member and provided with an inlet passage for water under pressure, a spring for holding the hollow member in a normal position against the pressure existing in the cylinder during the expansion of gases of combustion therein and adapted to permit the hollow member to be moved into a position in which the opening near its one end registers with the said inlet passage whenever an explosion takes place in the cylinder, a set screw for determining the extent of movement of the said hollow member, and a rotary body at the outlet end of the hollow member provided with a spiral groove for imparting a whirling action to the outflowing water.

4. In an internal combustion engine, a water inlet into the combustion chamber, means for normally closing the said water inlet, means for only opening the said inlet for a moment immediately after each explosion in the engine cylinder, a working piston, means for directing water from the said inlet towards the piston of the engine, a slotted sheet iron plate with a strongly oxidized surface for receiving the said water, means for holding the said sheet at a distance from the end surface of the said piston, the slots of the plate being located at one side of humps in the said plate.

5. In an internal combustion engine provided with a piston and a combustion chamber, an injector, said injector being provided with means for spraying fluid into said combustion chamber immediately after each explosion, and a plate arranged on said piston in position to receive the spray from said injector, said plate being oxidized, slotted and spaced from said piston, as and for the purposes set forth.

In testimony whereof I affix my signature in presence of a witness.

HERMANN FISCHER.

Witness:
C. HOLZERMANN.